United States Patent [19]

Wong

[11] Patent Number: 5,185,407
[45] Date of Patent: Feb. 9, 1993

[54] POLYMERIC PHENOLIC ESTERS

[75] Inventor: Pui K. Wong, Houston, Tex.

[73] Assignee: Shell Oil Company, Houston, Tex.

[21] Appl. No.: 751,474

[22] Filed: Aug. 29, 1991

[51] Int. Cl.$^5$ ............................................. C08F 8/14
[52] U.S. Cl. ................................ 525/328.8; 525/219; 525/384; 526/313
[58] Field of Search ...................... 525/328.8; 526/313

[56] References Cited

U.S. PATENT DOCUMENTS

| | | | |
|---|---|---|---|
| 4,097,464 | 6/1978 | Kline | 260/62 |
| 4,243,581 | 1/1981 | Minagawa et al. | |
| 4,970,264 | 11/1990 | Lindert et al. | 525/328.8 |

Primary Examiner—Bernard Lipman

[57] ABSTRACT

Novel stabilized compositions comprise organic material normally subject to oxidative degradation stabilized by the presence therein of a stabilizing quantity of a novel, at least partial ester of poly(vinylphenol) and a 3,5-dialkyl-4-hydroxybenzoic acid wherein at least one of the alkyl groups is a bulky alkyl.

6 Claims, No Drawings

POLYMERIC PHENOLIC ESTERS

FIELD OF THE INVENTION

The invention relates to polymeric phenolic esters useful as antioxidants. More particularly, the invention relates to novel hindered phenolic esters of poly(vinylphenol) and to organic material normally subject to oxidative degradation stabilized by the presence therein of the novel esters.

BACKGROUND OF THE INVENTION

The use of stabilizers in organic materials normally subject to oxidative degradation is a widespread commercial practice. Such stabilizers provide enhanced stability to a variety of organic substrates in which they are incorporated and in many instances are responsible for a commercially acceptable utility for such materials. A particularly useful application for the stabilizers is in the production of commercially desirable polymers and polymeric products. Most, if not all, of the commercial polyolefins such as polypropylene or polyethylene will contain one or more stabilizers to enhance the oxidative stability of the polymers.

One class of oxidation stabilizers which has gained widespread commercial acceptance is the class conventionally referred to as hindered phenols. Such stabilizers will typically contain a phenolic hydroxyl as a substituent on an aromatic ring which also has a bulky substituent, e.g., a bulky alkyl substituent, on at least one aromatic ring carbon atom located ortho to the carbon atom on which the hydroxyl is substituted. Perhaps the most commonly used antioxidants of this type contain the 2,6-di-tert-butylphenol moiety. Numerous patents and other references, both U.S. and foreign, describe antioxidants of this type. Many are commercially employed, particularly as antioxidants for polymeric materials such as polypropylene.

The majority of hindered phenolic antioxidants are monomeric compounds. Although the monomeric antioxidants are of relatively high molecular weight and thus have relatively low volatility, there is some tendency for the hindered phenolic stabilizers to migrate from the polymeric substrate when a stabilized composition containing the hindered phenol is exposed to elevated temperatures or conditions of reduced pressure. Such conditions of temperature and pressure are frequently encountered during the processing of the polymeric or other organic substrate. Moreover, the hindered phenols are also susceptible to extraction when the stabilized composition is in extended contact with solvents.

The shortcomings of the conventional monomeric hindered phenol antioxidants are recognized and have been addressed by the art. Kline, U.S. Pat. No. 4,097,464, discloses self-stabilizing polymers obtained by copolymerization of unsaturated comonomers with 2,6-dialkyl-4-vinylphenols. The copolymers are said to have advantages because the antioxidant cannot be extracted or volatilized from the polymer. Minagawa et al, U.S. Pat. No. 4,243,581, disclose polypropylene compositions containing poly(tert-butyl-p-vinylphenol) and dialkyl thiodipropionate to provide stabilization against oxidative degradation. However, it would be of advantage to provide additional polymeric hindered phenolic compounds which serve as stabilizers for organic materials normally subject to oxidative degradation.

SUMMARY OF THE INVENTION

The present invention provides novel polymeric hindered phenolic compounds useful as oxidative stabilizers in organic material normally subject to oxidative degradation. More particularly, the invention provides esters of poly(vinylphenol) and a benzoic acid additionally containing a hindered phenolic moiety. The invention also provides stabilized compositions comprising organic material normally subject to oxidative degradation stabilized by the incorporation therein of the polymeric hindered phenolic ester.

DESCRIPTION OF THE INVENTION

The novel polymeric antioxidants of the invention are at least partial esters of a poly(vinylphenol) and a 3,5-di-tert-butylhydroxybenzoic acid wherein at least one of the alkyl groups is a bulky alkyl group. These esters provide oxidative stabilization to organic material normally subject to oxidation upon contact with oxygen, particularly at elevated temperatures.

The poly(vinylphenol) precursor of the esters of the invention is a homopolymer or copolymer of a vinylphenol containing a major proportion of vinylphenol units in the polymeric chain. Although polymers of ortho-, meta- or para-vinylphenol are suitably employed, the preferred poly(vinylphenol) ester precursor is a homopolymer of p-vinylphenol, i.e., the polymer represented by the repeating formula

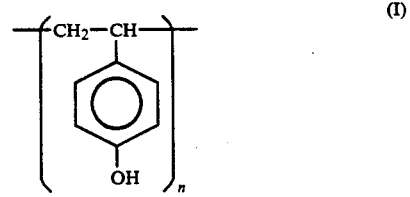

(I)

wherein n is a number sufficient to provide a number average molecular weight for the poly(vinylphenol) polymer from about 2000 to about 75,000, although poly(vinylphenols) of a higher or lower molecular weight are useful as precursors of the novel ester antioxidants of the invention. Preferred are poly(vinylphenols) of number average molecular weight from about 5000 to about 50,000.

The poly(vinylphenols) are known compounds or are prepared by known methods. They are often produced by conventional procedures of bulk polymerization or solution polymerization of appropriate monomer in the presence of a cationic polymerization catalyst such as boron trifluoride trietherate. Such procedures are known in the art.

The precise purity of the poly(vinylphenol) is not critical to the practice of the invention although on some occasions it is useful to employ a polymer of relatively high purity. Such polymer is produced by a variety of known methods including dehydrogenation of p-ethylphenol followed by polymerization and subsequent purification or alternatively by polymerization of p-acetoxystyrene followed by hydrolysis to the poly(vinylphenol). The production of poly(vinylphenol) is described in more detail in Kanezaki, U.S. Pat. No. 4,028,340, and Fujiwara et al, U.S. Pat. No. 4,517,349.

The acid precursor of the novel polymeric hindered phenolic esters of the invention is a 3,5-dialkylhydroxybenzoic acid wherein at least one alkyl is an alkyl group of sufficient bulk to sterically hinder the phenolic hydroxyl group attached to an adjacent ring carbon atom. Such acids are 3,5-dialkyl-2-hydroxybenzoic acids or 3,5-dialkyl-4-hydroxybenzoic acids. The latter are preferred and are represented by the formula

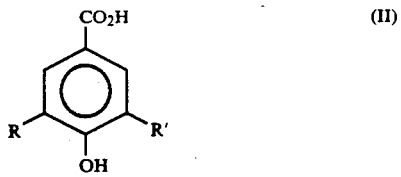

wherein R is a secondary or tertiary alkyl group of from 3 to 8 carbon atoms inclusive and R' is an alkyl group of up to 8 carbon atoms inclusive. Illustrative of R groups are isopropyl, sec-butyl, tert-butyl, sec-amyl, tert-amyl and tert-hexyl. The preferred R groups are tert-butyl and tert-amyl, particularly tert-butyl. R' groups, which are inclusive of R groups, are illustrated by methyl, ethyl, n-propyl, isopropyl, n-butyl, tert-butyl, hexyl and octyl. Preferred R' groups are R groups. The benzoic acid of the above formula II is illustrated by 3-methyl-5-tert-butyl-4hydroxybenzoic acid, 3-ethyl-5-tert-amyl-4-hydroxybenzoic acid and 3,5-diisopropyl-4-hydroxybenzoic acid. The preferred benzoic acids of formula II are those wherein R' is R, e.g., 3,5-di-tert-butyl-4-hydroxybenzoic acid and 3,5-di-tert-amyl-4-hydroxybenzoic acid. The acid 3,5-di-tert-butyl-4-hydroxybenzoic acid is preferred.

The polymeric hindered phenolic esters of the invention are produced by esterification of at least a portion of the phenolic hydroxyl groups of the poly(vinylphenol) with the dialkylhydroxylbenzoic acid. Methods of effecting the esterification are conventional. In one modification the benzoic acid is converted to an ester and subsequent transesterification with the poly(vinylphenol) produces the desired polymeric esters. A preferred procedure, however, comprises the conversion of the benzoic acid to the corresponding acid chloride as by reaction with thionyl chloride. The acid chloride is then reacted with the poly(vinylphenol) to esterify at least a portion of the phenolic hydroxyl groups of the poly(vinylphenol).

The esterification process results in esterification of some but not necessarily all of the phenolic hydroxyl groups of the poly(vinylphenol) in order to produce an effective polymeric antioxidant. In general, from about 1% to about 100% of the phenolic hydroxyl groups are esterified with moieties of the benzoic acid. Preferably, from about 1% to about 20% of the phenolic hydroxyl groups are esterified with the dialkylhydroxybenzoate group. More preferably, from about 5% to about 20% of the phenolic hydroxyl groups are esterified.

The resulting polymeric hindered phenolic esters are useful as stabilizers for organic material normally subject to oxidative degradation. Such materials are well known and include foodstuffs, elastomers, gasoline and lubricating oil compositions and other material known to degrade, particularly at elevated temperature, in the presence of molecular oxygen. The preferred application of the invention is to retard the oxidative degradation of polymeric compositions and particularly polyolefin compositions such as polypropylene, polyethylene and ethylene/propylene copolymers. The polymeric hindered phenolic esters impart oxidative stability to such organic material upon inclusion therein of a stabilizing quantity of the polymeric hindered phenolic ester. Such stabilizing quantity is from about 0.01% by weight to about 10% by weight based on total composition. Preferred stabilizing quantities ar from about 0.1% by weight to about 5% by weight on the same basis.

The polymeric hindered phenolic esters are incorporated into the organic substrate by methods well known for the incorporation of one solid material into an organic solid or liquid. Conventional methods include preparation of a stabilized composition in a mixing device operating at high shear. In the case of many polymeric materials which are thermoplastic, the stabilized compositions are produced in an extruder which is normally employed in the processing of thermoplastic polymers. The stabilized compositions of the invention may also include, if desired, one or more of a variety of conventional additives such as other stabilizers, fillers, colorants, dyes or processing aids which are incorporated into the composition together with or separately from the polymeric hindered phenolic ester.

The compositions of the invention demonstrate enhanced oxidative stability as compared with corresponding compositions not containing the polymeric hindered phenolic ester. The compositions provide an advantage in that the polymeric stabilizers are not readily extracted upon contact with common solvents and will not migrate from the substrate upon exposure to elevated temperature.

The invention is further illustrated by the following Illustrative Embodiment which should not be regarded as limiting.

ILLUSTRATIVE EMBODIMENT

A mixture of 3,5-di-tert-butyl-4-hydroxybenzoic acid (10 g, 40 mmol) and 20 ml of thionyl chloride was stirred at room temperature until an homogeneous solution was obtained. The excess thionyl chloride was then removed under reduced pressure. The resulting acid chloride was added to a solution of poly(p-vinylphenol) of number average molecular weight 6200 (50g) in 500 ml of tetrahydrofuran. After heating at reflux for 12 hours, the resulting mixture was poured into water. The gel which formed was dried and pulverized to yield 42 g of a tan powder. The $^{13}$C-NMR analysis of the powder was consistent with about 9% of the phenol units being esterfied with 3,5-di-tert-butyl-4-hydroxybenzoic acid.

The effectiveness of this polymeric hindered phenol as an antioxidant was measured in polypropylene in an oven test by producing thin films of an unstabilized 2.3 melt flow polypropylene and of the polypropylene containing 0.5% by weight of the polymeric hindered phenol. The films were placed in an oven (in air) at 125° C. and periodically removed and bent to an angle of 190 degrees. A film is defined as brittle when it breaks upon such bending. The unstabilized film failed after 14 days whereas the film stabilized by the presence of the polymeric hindered phenol failed after 38 days.

What is claimed is:

1. A polymeric hindered phenolic ester of a poly(vinylphenol) and a 3,5-dialkylhydroxybenzoic acid wherein at least one alkyl group is of sufficient bulk to sterically hinder the hydroxy group substituted on an adjacent ring carbon atoms.

2. The ester of claim 1 wherein the benzoic acid is of the formula

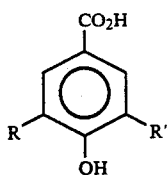

wherein R is a secondary or tertiary alkyl group of from 3 to 8 carbon atoms inclusive and R is alkyl of up to 8 carbon atoms inclusive.

3. The ester of claim 2 wherein the poly(vinylphenol) is represented by the repeating formula

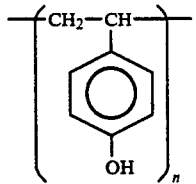

wherein n is a number sufficient to provide a number average molecular weight for the poly(vinylphenol) of from about 2000 to about 75,000.

4. The ester of claim 3 wherein from about 1% to about 100% of the phenolic hydroxyl groups of the poly(vinylphenol) are esterified.

5. The ester of claim 4 wherein R is tert-butyl or tert-amyl and R' is R.

6. The ester of claim 5 wherein R is tert-butyl.

* * * * *